(12) United States Patent
Villata

(10) Patent No.: US 8,512,843 B2
(45) Date of Patent: Aug. 20, 2013

(54) COMPOSITE MATRIX AND GEL PADDING AND METHOD OF MANUFACTURING

(76) Inventor: Richard B. Villata, Salt Lake City, UT (US)

( * ) Notice: Subject to any disclaimer, the term of this patent is extended or adjusted under 35 U.S.C. 154(b) by 317 days.

(21) Appl. No.: 12/907,602

(22) Filed: Oct. 19, 2010

(65) Prior Publication Data

US 2012/0070606 A1   Mar. 22, 2012

Related U.S. Application Data

(60) Provisional application No. 61/403,462, filed on Sep. 17, 2010.

(51) Int. Cl.
| | |
|---|---|
| *B32B 3/00* | (2006.01) |
| *B32B 27/04* | (2006.01) |
| *B29C 39/00* | (2006.01) |
| *C08L 75/04* | (2006.01) |

(52) U.S. Cl.
USPC ......... 428/71; 2/171; 2/205; 428/68; 428/158

(58) Field of Classification Search
USPC ..................... 428/71, 68, 158; 2/171, 205
See application file for complete search history.

(56) References Cited

U.S. PATENT DOCUMENTS

| | | | |
|---|---|---|---|
| 5,007,111 A * | 4/1991 | Adams | ................. 2/22 |
| 5,749,111 A | 5/1998 | Pearce | |
| 5,947,918 A | 9/1999 | Jones et al. | |
| 6,025,067 A | 2/2000 | Fay | |
| 6,026,527 A | 2/2000 | Pearce | |
| 6,070,271 A | 6/2000 | Williams | |
| 6,704,943 B2 | 3/2004 | Calonge Clavell | |
| 7,062,795 B2 | 6/2006 | Skiba et al. | |
| 7,076,811 B2 | 7/2006 | Puchalski | |
| 7,141,032 B2 | 11/2006 | Flam et al. | |
| 7,254,843 B2 | 8/2007 | Talluri | |
| 8,231,756 B2 | 7/2012 | Kim | |

\* cited by examiner

*Primary Examiner* — Brent O'Hern
(74) *Attorney, Agent, or Firm* — Paul C. Oestreich; Eminent IP, P.C.

(57) ABSTRACT

Composite and laminated composite padding materials or cushions formed from an elastic foam matrix structurally supporting and encapsulated gel elements are disclosed. Methods of manufacturing such composite and laminated composite padding materials or cushions are also disclosed.

10 Claims, 10 Drawing Sheets

1400

COMPOSITE MATRIX AND GEL PADDING AND METHOD OF MANUFACTURING

CROSS-REFERENCE TO RELATED APPLICATIONS

This nonprovisional patent application claims benefit and priority under 35 U.S.C. §119(e) of the filing of U.S. Provisional Patent Application Ser. No. 61/403,462 filed on Sep. 17, 2010, titled "G-Acceleration Protection Composite Material (G-Pro)", the contents of which are incorporated by reference as if fully set forth herein.

BACKGROUND OF THE INVENTION

1. Field of the Invention

This invention relates generally to padding materials that may be used for a variety of applications. More particularly, the invention relates to composite matrix and gel padding or cushions and a method of manufacturing such paddings and cushions.

2. Description of Related Art

The present state of the art for impact absorption is to use materials such as high density polystyrene foam in helmets or viscoelastic foams and gels in padding. There are a wide variety of high density polystyrene foam densities available, referred to herein under the brand name, Styrofoam®. Styrofoam® is a registered trademark of The Dow Chemical Company, P.O. Box 2166, Midland, Mich., 48641. Packing materials have very low densities of 1 pound per cubic foot, while higher density foams of 3 pounds per cubic foot can be found in helmet liners. Visocelastic foams and gels vary in density from 5 pounds per cubic foot in some foams to as much as 65 pounds per cubic foot in gels. Low density foams begin to crush or compress with lower amounts of applied force compared to high density foams. The resistance to compression in gels is a function of the hardness as determined by the Shore durometer rating. Gels with high Shore values behave more like rigid solids, while those with low Shore values behave more like viscous liquids. It is this inherent resistance to compression that determines how much acceleration an object is subject to when it strikes the surface of an impact absorbing material. The various materials employed for this purpose thus far have shown wide-ranging capabilities to attenuate accelerative forces at highly variable velocity profiles.

Tissue injury due to sustained compressive forces or rapid acceleration/deceleration has been well documented. Various materials have been employed to reduce the amount of tissue damage (i.e., pressure sores, concussions, etc.) that can occur when there is sufficiently high force or acceleration on the body. Materials such as Styrofoam® (a light, resilient foam of polystyrene available from Dow Chemical Co.), viscoelastic polyurethane foam, and polyurethane gel have been used as padding materials. One problem with the design of some of these padding materials has been the lack of suitable testing to determine the amount of protection afforded by the material in terms of G-acceleration or deceleration. Another problem is the weight and cost of the material, particularly for polyurethane gel. Some inventors have included measurements on the amount of force or acceleration protection that the padding material provides. While this information is helpful it does not fully assess the potential effects of acceleration alone, or of force, which is mass dependent, on body tissues. In the case of head injury the present American Society for Testing and Materials (ASTM) standards for helmets do not provide adequate protection from the effects of acceleration and force. However, it is difficult to change conventional helmet structural designs because of the legal liability resulting from head injuries involving helmets. Consequently, it is necessary to develop new padding materials that are able to provide a superior level of protection from acceleration and the effects of mass on bodily tissues.

Inherent protection of bodily parts from compressive forces, acceleration and deceleration is effected by integument, adipose, and skeletal tissues. The skeletal system provides protection from penetration and compression of internal organs, but has little ability to mitigate the effects of acceleration on the organ system. Protection from acceleration is effected by the integument and adipose tissues due to their ability to sustain stretching and compression. Various forms of polyurethane have demonstrated excellent properties in this regard, particularly the gel and viscoelastic foam formulations. One problem with the use of such materials is that no one form is able to provide the broad range of characteristics that may be required in a protective material.

The background art is further characterized by U.S. Pat. Nos. 7,254,843 to Talluri; 7,141,032 to Flam et al.; 7,076,811 to Puchalski; 7,062,795 to Skiba et al.; 6,704,943 to Calonge Clavell; 6,070,271 to Williams; 6,026,527 to Pearce; 6,025,067 to Fay; 5,947,918 to Jones et al.; 5,749,111 to Pearce; the disclosures of all of which are incorporated by reference as if fully set forth herein.

Thus, it would be advantageous to have composite padding materials that exhibit similar properties to those of skin, integument and adipose tissues of the human body. It would be advantageous if such a composite padding material was also light-weight and easy to manufacture.

SUMMARY OF THE INVENTION

Composite and laminated composite padding materials or cushions formed of an elastic foam matrix supporting and encapsulated gel elements and methods of manufacturing same are disclosed.

An elastic composite cushion is disclosed. The cushion may include an array of viscous gel elements. The cushion may further include an elastic matrix encapsulating the array of viscous gel elements, wherein upon compression of the elastic composite cushion, the gel elements flatten until adjacent neighboring gel elements restrict further flattening.

A layer of padding is disclosed. The layer of padding may include an elastic matrix including an array of regularly spaced voids formed within the elastic matrix. The layer of padding may further include one or more of the voids comprising a viscous gel.

A method of forming a polyurethane pad is disclosed. The method may include providing a mold for receiving polyurethane foam fluid having preselected dimensions of length, width and thickness, the mold having a bottom surface and an array of structural elements extending from the bottom surface. The method may further include providing a polymerizable polyurethane foam fluid. The method may further include providing a soft polyurethane gel. The method may further include disposing the polymerizable polyurethane foam fluid over the mold. The method may further include polymerizing the polymerizable polyurethane foam fluid. The method may further include removing the mold from the polymerized polyurethane foam fluid to obtain polyurethane foam having voids corresponding to the array of structural elements extending from the bottom surface of the mold. The method may further include selectively injecting the soft polyurethane gel into the voids. The method may further include sealing the selectively injected soft polyurethane gel within the voids thereby forming the polyurethane pad.

Additional features and advantages of the invention will be set forth in the drawings and detailed description which follows, and in part will be apparent from the description, or may be learned by the practice of the present invention.

BRIEF DESCRIPTION OF THE DRAWINGS

The following drawings illustrate exemplary embodiments of the invention. Like reference numerals refer to like parts in different views or embodiments of the present invention in the drawings.

DETAILED DESCRIPTION

Figure 1:
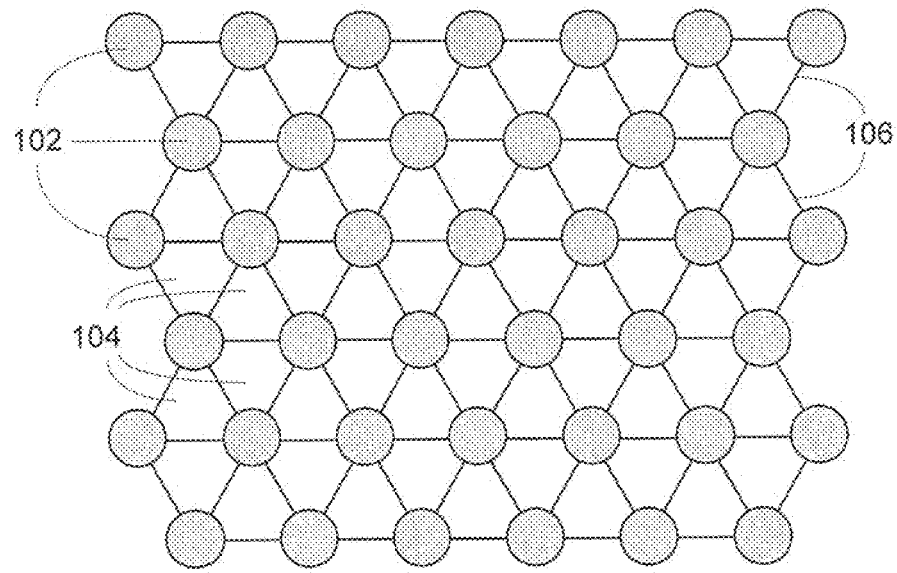
FIG. 1 is a schematic diagram of a top view of a portion of an embodiment of a layer of padding, according to the invention.

The inventive composite elastic padding may include one or more layers of an elastic matrix surrounding regularly spaced soft gel elements in various unique geometric configurations, according to embodiments of the invention. Embodiments of the invention also include methods of forming such composite padding materials and cushions.

The terms "cushion" and "pad" are used interchangeably in reference to the inventive composite elastic padding material described herein. The term "G Pro™" is a trademark associated with various embodiments of the composite and laminated composite padding materials or cushions referenced herein, according to the invention. The term "elastic" as used herein refers to a characteristic of materials that return substantially to their original shape following deformation and the subsequent release of the deformation force. The term "visco-elastic" relates to both the rate of deformation and the rate of reformation. With reference to the deformation rate, the faster a deforming force is applied to a visco-elastic material, the stiffer it is. Also, the rate of reformation of a visco-elastic material is slower than that of a truly elastic material.

The invention is a composite material used for attenuating the force due to acceleration when a body in motion is suddenly stopped. The amount of force, F, generated is equal to the mass, m, times the acceleration, a, or F=ma. The amount of acceleration encountered is a function of the resistance of the material that is impacted. A very hard surface such as concrete or steel is considered to be inelastic. Any object striking a hard surface will rebound, or bounce back from the surface if that surface is immobile. This can result in very high acceleration values as governed by the equation $a=2\ d/t^2$, where distance=d and time=t. In simple terms this means that an object moving at a given velocity will have a rate of acceleration that is proportional to the distance and time that is required for it to come to rest. When two hard and relatively inelastic objects strike one another, they come to rest in short distances with the collision occurring in a small amount of time. The result is a very high rate of acceleration.

When an object strikes a relatively soft surface, the velocity of the object is allowed to decrease via compression of the soft surface. This results in an increased distance and time for the object to come to rest. In this case the rate of acceleration is decreased. The amount of force encountered by a moving object is therefore a function of the hardness or resistance to compression that is inherent in the material that is being impacted. Very hard or soft materials can result in high rates of acceleration due to the inability to compress or being too soft to sufficiently resist the moving object.

The amount of compression that can be achieved in a given material is also a function of the amount of energy delivered to the material. This can be defined by the impacting object's kinetic energy, K, which is proportional to mass times the velocity, V, squared, or $K=mV^2/2$. This means that an object moving twice as fast as an object with similar mass will have a kinetic energy that is four times greater. This has important implications in the design of impact energy absorbing materials since the velocity of the object striking the material can be highly variable. Higher velocities result in much greater kinetic energies, which will affect the rate of compression in the material being struck. More rigid materials may not compress when the amount of kinetic energy is insufficient, which can result in higher rates of acceleration as the object comes to rest. As the velocity or kinetic energy increases the material may compress resulting in only slightly higher, similar, or even lower rates of acceleration.

An embodiment of an elastic composite cushion, according to the invention, may include an array of viscous gel elements and an elastic matrix encapsulating the array of viscous gel elements. During compression of the elastic composite cushion, the gel elements flatten until adjacent neighboring gel elements restrict further flattening, according to embodiments of the invention. According to other embodiments of the invention, each of the gel elements when uncompressed may have a cylindrical, spherical, cubic or other suitable shape.

According to other embodiments, the foam matrix may include one or more of the following materials: flexible polyurethane, viscoelastic polyurethane, urethane, or silicone rubber. According to still other embodiments, the viscous gel may include polyurethane gel and/or silicone gel. It will be understood that other viscous gel materials may be used consistent with the principles of the present invention.

According to another embodiment, the cushion may include a layer of composite padding having any preselected dimensions of length, width and thickness. A fundamental feature of the cushions disclosed is that they may be formed to any thickness, width and length combination for any particular application. Additionally, the cushions may be shaped into any suitable three-dimensional shape for any particular application. For example, the cushion may be shaped to provide cushion on the inside of a helmet used to protect a human head. Of course, it will be readily apparent that there are countless applications for the cushions and padding materials described herein. According to another embodiment, a cushion may be formed by laminating two or more layers of composite padding as described herein.

According to yet another embodiment, the cushion may include regularly spaced voids encapsulated by the foam matrix. According to one embodiment, the voids may contain a compressible gas. According to a particular embodiment, the compressible gas may comprise air. Of course, any compressible gas could be used consistent with the present invention. The purpose of having voids with a compressible gas is to allow surrounding gel elements, to flatten under compression of the cushion and thereby expand into the space of the voids via the compression of the gas within them.

Another embodiment of a layer of padding is disclosed. The layer of padding may include an elastic matrix including an array of regularly spaced voids formed within the elastic matrix. According to one embodiment of the layer of padding, one or more of the voids may include a viscous gel. According to yet another embodiment, one or more of the voids may be filled with a compressible gas. According to a particular embodiment, the compressible gas may be air. It will be understood that any suitable compressible gas may be used to fill one or more of the voids according to the invention. Another embodiment of the layer of padding may include an elastic matrix formed of flexible polyurethane foam. Still another embodiment of the layer of padding may include an elastic matrix formed of viscoelastic polyurethane foam. General embodiments of the layer of padding may include voids having any suitable shape or cross-section and may even be randomly shaped. But, specific embodiments of the layer of padding include voids having an uncompressed cross-section selected from the group consisting of: circle, hexagon and triangle.

An embodiment of a laminated padding is disclosed. The laminated padding may be formed of a plurality of layers of padding disclosed herein. The layers of padding may be adhered to one another using adhesives and glues known to those of ordinary skill in the art. By, forming such layers of padding into a laminated padding, any suitable thickness of padding may be obtained for various applications.

Presently preferred embodiments of the invention include at least two forms of polyurethane polymers: (1) either flexible polyurethane foam or viscoelastic polyurethane foam, and (2) a soft polyurethane gel integrated to form a layer of padding which may be laminated with one or more other layers of padding. The polymer materials are combined in unique geometric designs based on regularly spaced cylindrical elements arranged in a triangular, hexagonal or other structure. FIG. 1 is a schematic diagram of a top view of an embodiment of a layer of padding 100 according to the invention. As shown in FIG. 1, the cylindrical elements 102 are represented by circles at the vertices of equilateral triangles connected by lines 106 forming an array that may be extended in any direction to form a regular pattern of triangular and/or hexagonal elements. The cylindrical elements 102 are surrounded by polyurethane foam 104 to provide structure and support for the cylindrical gel elements 102. In FIG. 1, the polyurethane foam 104 may be found in the equilateral triangular spaces delineated by lines 106 surrounding the elements 102. The lines 106 drawn between the cylindrical elements 102 of FIG. 1 are shown only to help visualize the triangular and/or hexagonal geometric orientation of the cylindrical elements 102 relative to one another. Lines 106 do not form any structural element of padding 100, but fall within the space of the surrounding polyurethane foam 104.

According to various embodiments, each of the cylindrical elements 102 may be a soft polyurethane gel encapsulated or surrounded by either a flexible polyurethane foam or viscoelastic polyurethane foam as a support structure represented by the surrounding space represented by the equilateral triangles 104 and lines 106 shown in FIG. 1. Thus, the space surrounding (as schematically represented by equilateral triangles 104 and lines 106) each of the cylindrical elements 102 may be a polyurethane foam material, i.e., either flexible polyurethane foam or viscoelastic polyurethane foam, according to embodiments of the invention.

As can be appreciated by one of ordinary skill in the art, various gel and foam configurations are possible depending on the desired three-dimensional structure of the padding material. These various configurations may be achieved by laminating multiple layers of the padding material to form laminated padding. For example and not by way of limitation, by vertically offsetting layers of the triangular orientation layer of padding 100 shown in FIG. 1 with respect to the adjacent layers of the same padding, a laminated padding material may be achieved according to various embodiments of the invention.

Figure 2:
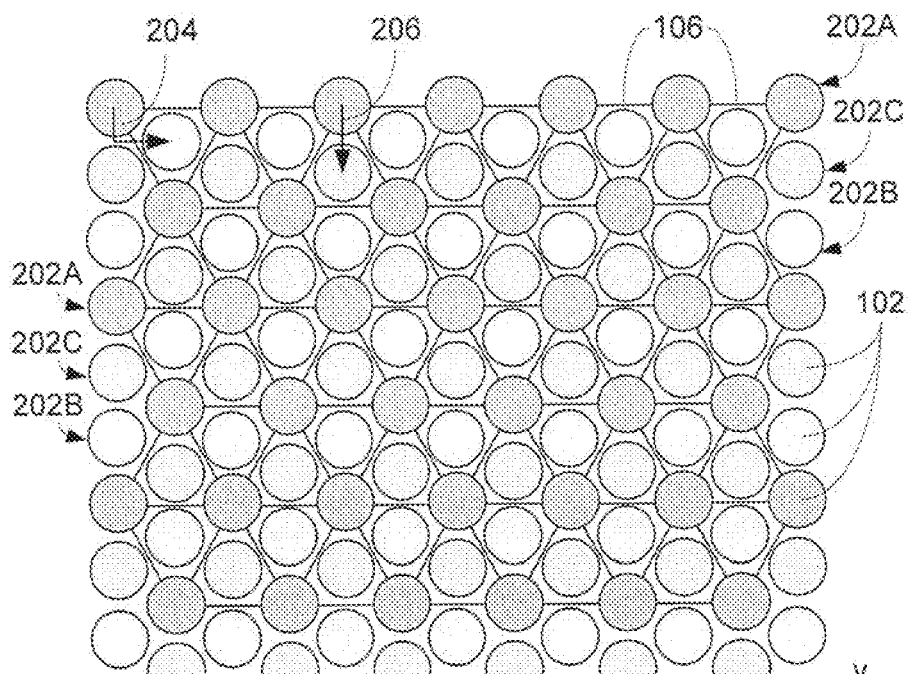
FIG. 2 is a schematic diagram illustrating an embodiment of a laminated padding material formed from three layers of the padding shown in FIG. 1.

FIG. 2 is a schematic diagram illustrating an embodiment of a laminated padding material 200 formed from three offset layers 202A-C of the padding 100 shown in FIG. 1. Each layer 202A-C is offset vertically because it forms an individual layer in a composite pad. Note also that the hexagonal pattern of elements in each layer 202A-C is offset in the x-y plane of FIG. 2 from the hexagonal pattern of adjacent layers. FIG. 2 illustrates a vertical, or plan view of the three offset layers 202A-C with the space surrounding each of the cylindrical elements 102 transparent for illustration purposes. However, the padding material 200 and its layers 202A-C may or may not be transparent and may in fact be opaque.

For purposes of illustration, the top layer of padding, shown generally at arrows 200A, includes an array of cylindrical elements 102, the cylindrical elements 102 surrounded by polyurethane foam 104, similar to layer of padding 100 (FIG. 1). The cylindrical elements 102 of top layer 202A are shown connected by lines 106 to emphasize the regular pattern of the array, though lines 106 do not form any structure of padding material 200.

The middle layer of padding, shown generally at arrows 202B, may be laminated underneath the top layer of padding 202A and is offset horizontally, i.e., down (y-axis) and to the right (x-axis), as shown by bent arrow 204. The bottom layer of padding 202C may be laminated underneath the middle layer of padding 202B and is offset horizontally, i.e., down (y-axis), relative to the top layer of padding 202A as shown by down arrow 206. The middle layer 202B and bottom layer 202C are also composed of cylindrical elements 102 arranged spatially in the same manner as the top layer of padding 202A, but offset horizontally as shown by arrows 204 and 206, and displaced vertically relative to one another by virtue of the layer 202A-C placement in the vertical dimension (z-axis, not illustrated but perpendicular to x-y plane). The vertically offset layers of hexagonal or triangular grouped cylindrical elements 102 may, of course, be extended beyond the three layers illustrated in FIG. 2, to encompass any number of layers suitable for a given application. It will also be understood that reference to "top", "middle" and "bottom" with regard to layers 202A-C is merely for ease of discussion and the layers 202A-C could be in any order vertically.

The purpose for offsetting the cylindrical elements 102 horizontally with the three layers 202A-C shown is that during compression of padding material 200, the surrounding polyurethane foam 104 (not shown in FIG. 2 but indicated in FIG. 1 and inclusive of the locations of lines 106) will readily compress. Whereas the cylindrical elements 102, formed of a gel material according to one embodiment, will generally only deform and not significantly compress. The deformation of cylindrical elements 102 under compressive forces will generally be in form of flattening similar to squashing a rubber ball. The structure and elasticity of the surrounding polyurethane foam 104 will return the flattened cylindrical elements 102 to their generally cylindrical shape once the compressive force is removed.

Figure 3:
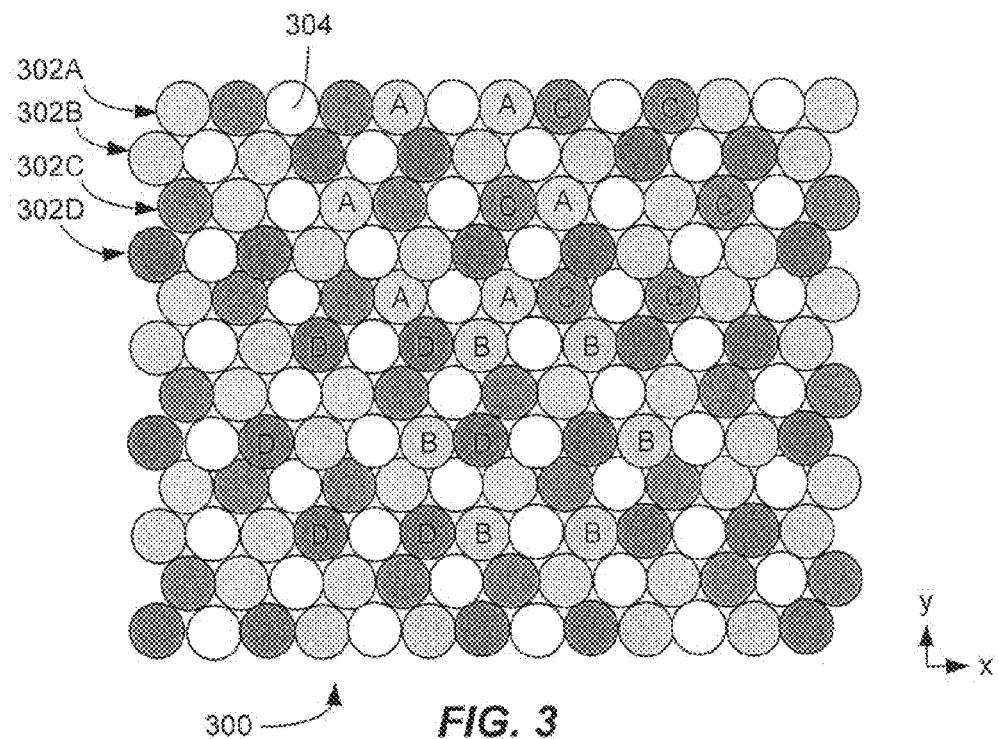
FIG. 3 is a schematic diagram illustrating an embodiment of a laminated padding material formed from four layers, according to the invention.

FIG. 3 is a schematic diagram illustrating an embodiment of a laminated padding material 300 formed from four discrete layers, shown generally at arrows 302A-D, of the padding 100 shown in FIG. 1. Each shaded circle represents a cylindrical element (102 FIG. 1). FIG. 3 is a top or plan view of hexagonally oriented elements as viewed into the z-axis of the x-y plane of FIG. 3, where each layer 302A-D is represented by a different shade of circle. In FIG. 3, each layer is shown translucent so that lower layers are not hidden from upper layers. Each layer of hexagonally oriented elements may be offset in the x-y plane, similar to the layers described in FIG. 2. Representative hexagonal groupings of cylindrical elements in each of the four layers have been marked with the letters A-D, corresponding with layers 302A-D, to assist in visualizing the spatial (x-y axis) orientation of the layers 302A-D of padding material 300.

Another feature of the laminated padding material 300 is the introduction of void spaces 304 (shown as white circles in FIG. 3). The void spaces 304, containing ambient pressure air, provide a readily compressible space on each of the layers 302A-D. Each discrete layer 302A-D, as shown by the various shadings, includes hexagonally oriented cylindrical elements, which may be filled with a gel material or ambient air according to one embodiment. The cylindrical elements are generally surrounded by a foam material, e.g., polyurethane or viscoelastic foams according to two embodiments. The foam material provides a resilient structure for each of the cylindrical elements. When layered with similar additional layers that are offset in the x-y plane, the net result is a smaller three-dimensional hexagonal structure.

The desired result of this design is that the discrete cylindrical elements in each layer intermesh in a situation in which compression (z-axis, or perpendicular to the x-y plane) may occur. Like the padding materials 100 and 200 described above, the laminated padding material 300 behaves like a spring, with the exception that the cylindrical gel elements are not confined to expanding in the horizontal direction, or x-y axes. The inclusion of air-containing cylindrical elements or voids 304 at the center of the hexagonal structure allows the gel to expand into this space as the amount of compression in the material 300 increases. In such a fashion, the laminated composite padding material 300 is able to compress to a greater degree than, e.g., more rigid foams, or other impact absorbing materials. Additionally, the use of viscoelastic foams and gels, unlike Styrofoam® or other flexible foams, allows considerable shear movements along the x-y axes. Allowing shear movements along the x-y axes is an important property for decreasing G accelerations that may occur in impacts having rotational components.

The embodiments of polyurethane foam materials used to surround and provide structural support for the cylindrical gel elements will now be described in further detail. The density of the polyurethane foams ranges from 5-10 pounds per cubic foot, while the density of the polyurethane gel is around 65 pounds per cubic foot. Thus, the foams are significantly less dense than the gel material used in the cylindrical elements. Flexible polyurethane foam is lightweight and does provide some protection from acceleration and compressive forces. However, polyurethane foam is relatively inelastic and does not flow from the point of impact very well. As a result the polyurethane foam material tends to compress in place until a maximum compression thickness is attained, i.e., fully compressed. At this point, the amount of G loading increases dramatically.

Viscoelastic polyurethane foam offers a significant advantage in that it has more elastic properties than flexible polyurethane foam. As a result, viscoelastic polyurethane foam more readily flows from the point of impact and can more fully compress, though it too will also reach a point of maximum compression. Thus for certain applications, viscoelastic polyurethane foam may be preferred over flexible polyurethane foam.

Depending on the durometer hardness of the gel formulation used in embodiments of the invention, a polyurethane gel can offer the greatest degree of flow and compression from the point of impact or force application. Unfortunately, this property comes at the expense of weight since polyurethane gel behaves like a fluid and has a density similar to water. Polyurethane gels are also not fully catalyzed and so they retain a sticky property that does not permit easy casting in complex shapes. The design of a suitable composite material must account for all of the foregoing in order to be practical from an economic and performance perspective.

Figure 4:
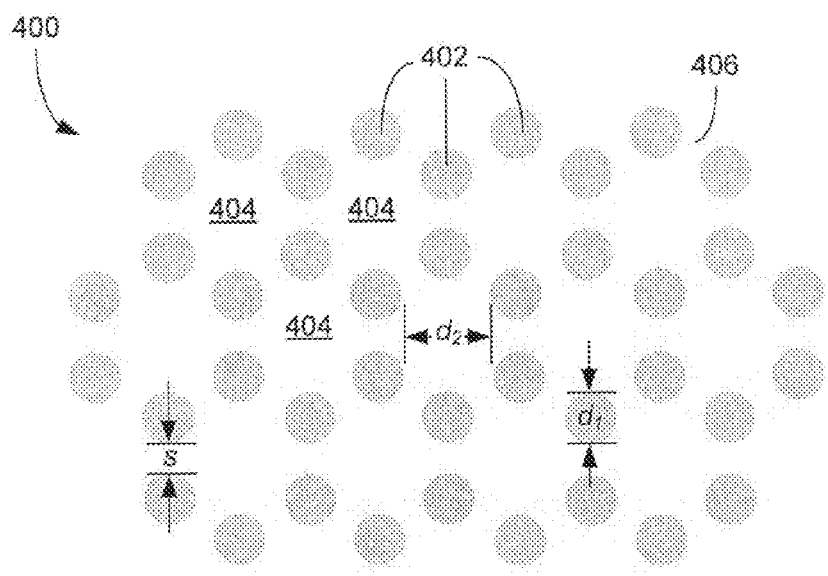
FIG. 4 is a schematic diagram of a plan view of an embodiment of a composite padding material having a geometric design, according to the invention.
Figure 5:
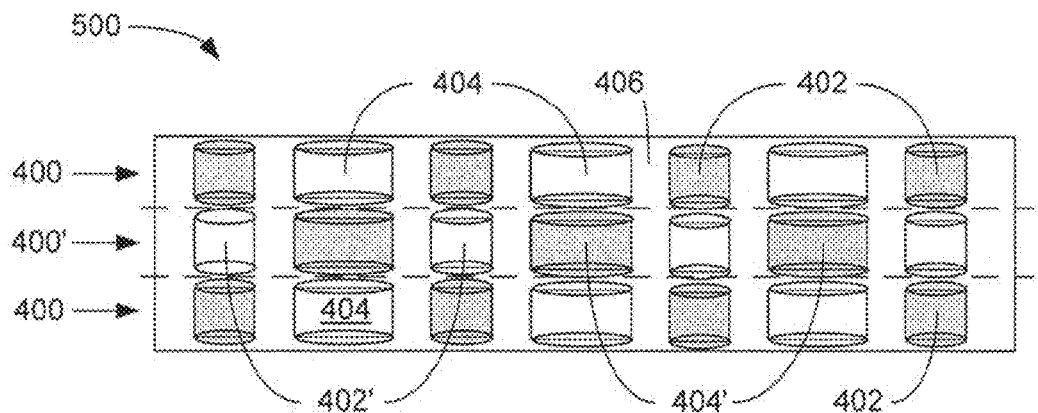
FIG. 5 shows a lateral or side elevation view of an embodiment of a laminated composite material composed of three laminated layers of composite padding material geometrically similar to the padding material shown in FIG. 4, according to the invention.

FIGS. 4-5 illustrate how these problems were addressed in embodiments of material configurations that are easy to produce and have the desired material properties. FIG. 4 illustrates a plan view of an embodiment of a padding material 400 having a geometric design. Depending on the thickness of each individual layer, which can be 0.125 to 0.500 inches or more, various sandwiched or laminated configurations can be constructed. The smaller diameter cylindrical elements 402 in this single layer embodiment are composed of polyurethane gel with a durometer hardness of 000 or higher and a density of 65 pounds per cubic foot. The larger circular areas are voids 404 containing ambient pressure air. The diameter, $d_2$, of voids 404 may be in a range from about 0.25 inches to about 0.75 inches, according to various embodiments. The shaded area surrounding the elements 402 and voids 404 is composed of polyurethane foam 406 with a density ranging from about 5 to about 10 pounds per cubic foot. According to one embodiment, the polyurethane foam 406 may be flexible polyurethane foam. According to another embodiment, the polyurethane foam 406 may be viscoelastic polyurethane foam.

According to various embodiments, the dimensions of the smaller circular gel elements 402 may range from about 0.25 inches to about 0.40 inches in diameter, $d_1$, with heights (not shown in the plan view of FIG. 4) ranging from about 0.25 inches to about 0.75 inches such that a cylindrical shape is formed. According to another embodiment, spacing, s, between the smaller gel cylinders 402 can be varied from about 0.125 inches to about 0.50 inches. The use of the term "about" in these approximate ranges is used to reflect manufacturing variations as known to those of skill in the art. Spacing, s, between the gel cylinders may be varied to change the G acceleration absorption characteristics of the padding material 400. As the gel cylinders 402 compress they begin to touch adjacent cylinders 402, thereby increasing the amount of resistance to further compression. Despite the resistance to compression that does occur, the gel material is still able to flow from the point of impact, though with increased resistance. The overall density of the composite padding material 400 is dependent on the proportion of foam 406, gel 402, and air (voids 404). According to the illustrated embodiment of composite padding material 400, the density is approximately 25 pounds per cubic foot. It will be understood that other densities may be achieved by varying the proportions of 406, gel 402, and air (voids 404) used to form the composite padding material 400.

FIG. 5 shows a lateral or side elevation view of an embodiment of a laminated composite material 500 composed of three laminated layers of composite padding material (shown generally at arrows 400 and 400' and delineated by dashed lines) geometrically the same as padding material 400 shown in FIG. 4, according to the invention. As shown in FIG. 5, there are outer layers of padding material 400 that are of the same geometric configuration as that shown in FIG. 4. However, the inner layer of padding material 400' contains smaller diameter cylindrical voids 402' containing only air at ambient pressures. The larger diameter cylindrical elements 404' now contain polyurethane gel. Thus, inner layer of padding material 400' is precisely opposite with regard to gel-filled cylindrical elements and voids. However, in both padding materials 400 and 400', the gel-filled cylindrical elements 402 and 404' as well as the voids 402' and 404 are structurally supported by polyurethane foam 406.

In this configuration or embodiment of padding material 500, the outer and inner layers 400 and 400' create a three-dimensional structure whereby cells containing gel are positioned above or below a layer where the cells vertically adjacent are void spaces 402' and 404, which only contain ambient pressure air. In this manner the laminated composite material 500 is able to compress to a greater degree as the gel portions compress into the corresponding void cells 402' and 404. It will be understood that embodiments incorporating two, three, or more sandwiched or laminated layers of gel and foam, such as 400 and 400' would provide a material suitable for use as padding in helmets, wheelchairs, beds, and any other suitable application for padding material. It will also be understood that such padding materials, e.g., laminated composite padding material 500, may have a substantially reduced weight and cost, relative to other conventional padding materials having similar characteristics.

Incorporation of a hard outer layer, or cap layer, of polyurethane plastic would provide resistance to penetration by sharp objects and attenuation of blunt forces, according to another embodiment of the invention (not shown). Such a hard outer layer may be laminated to an outer surface of any of the padding materials 100, 200, 300, 400 and 500 disclosed herein, according to other embodiments of the invention. According to still other embodiments, the padding materials 100, 200, 300, 400 and 500 disclosed herein may be encapsulated with a silicone or urethane coating. In such coated or capped configurations, the inner composite foam/gel padding material would provide protection from acceleration due to its ability to compress and flow from the point of impact.

Figure 6:
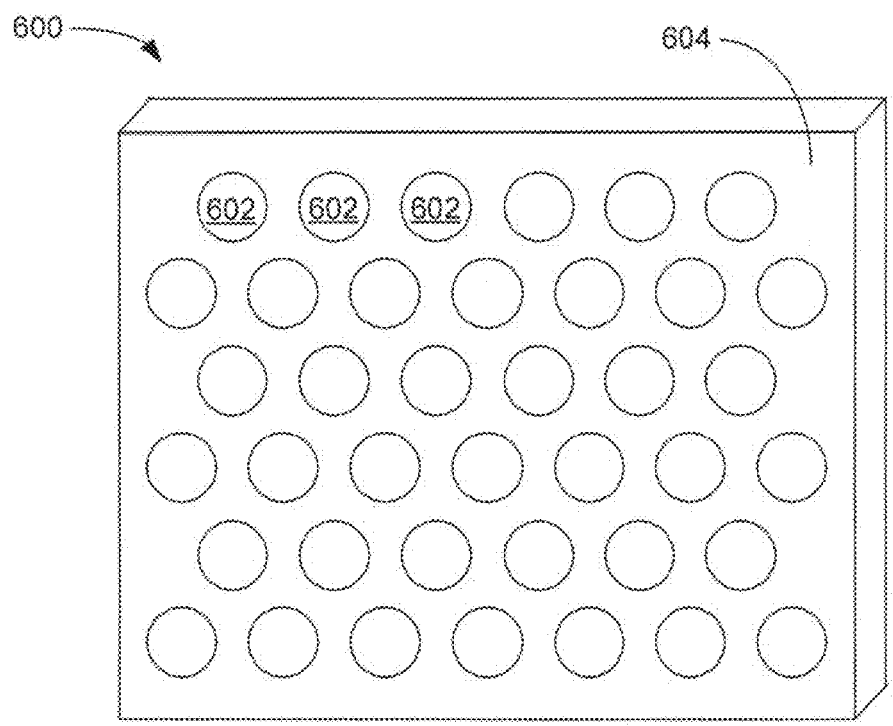
FIG. 6 is a schematic diagram of an embodiment of a polyurethane foam block having cylindrical holes formed therein, according to the invention.

The manufacturing of the composite padding material layers disclosed herein poses a challenge, since polyurethane gel is sticky and generally requires a non-sticky layer adjacent to the mold when it is cast. According to a method embodiment of the invention, the solution to this problem is to use the polyurethane foam component as the internal mold for the gel cylinders. FIG. 6 is a schematic diagram of an embodiment of a polyurethane foam block, shown generally at arrow 600, having cylindrical holes 602 formed therein, according to the invention. The cylindrical holes 602 are axially oriented perpendicular to an outer surface 604 of the polyurethane foam block 600. Unlike the gel component, the foam component is not sticky and it is able to form a thin skin during the casting process. As a result, a polyurethane foam block may be created in a mold with the desired gel cylinder shapes. The foam block is then easily removed and placed back into a suitably shaped second mold for the final gel casting stage. The gel casting stage can then use a sealing layer of either soft gel or hard polyurethane plastic shell material on the bottom of the mold for a bottom layer to the composite padding material. The soft foam block component is then placed atop the bottom layer in the second mold. The polyurethane gel is poured into the mold thus filling the cylindrical holes in the foam block component. Finally, a cap layer of gel or silicone rubber material then covers the entire foam block filled with polyurethane gel. The final result is a composite padding material that is bonded together and can be cut to shape for the desired use or application.

Impact Testing

Impact testing of the various materials described herein was accomplished via a drop test. This drop test consisted of a 4-foot long, 3-inch diameter ABS pipe mounted vertically on a hard concrete surface. A one-inch wide vertical opening along the length of the pipe permitted an accelerometer cable to move along the length of the pipe as the impact piston moved axially through the pipe. The impact piston consisted of 3-inch diameter cast iron cylinder with a mass of 1.170 kg or 2.576 lbs. The cylinder weight of 2.576 lbs exerted over a surface area of 7.07 square inches translates to a force of 0.364 pounds per square inch at rest. This approximates reasonably well with the amount of force that is exerted on the inner surface of a helmet based on the weight and surface area of an adult human head. Of course, the force that a human head exerts on an inner surface of a helmet may be dependent on head mass, circumference, load axis, helmet fit, and other variables. For the purposes of acceleration tests described herein, the mass of the cylinder chosen was determined to be sufficient.

Figure 7:
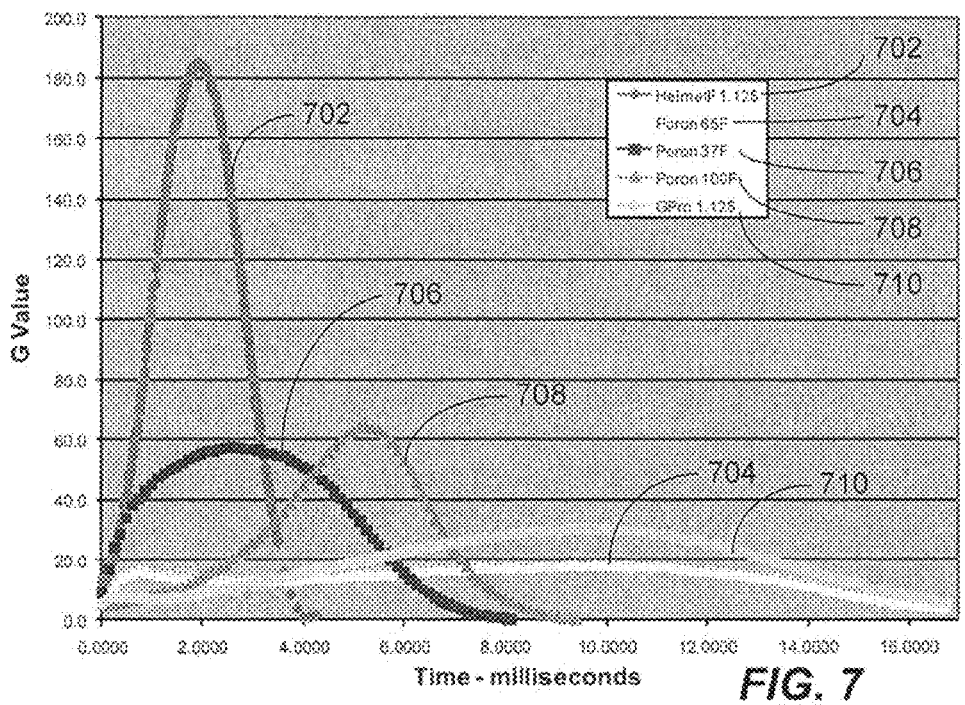
FIG. 7 shows the results of impact testing at 5 mph as a function of G value over time for an embodiment of a composite padding material according to the invention, as well as for conventional materials.
Figure 8:
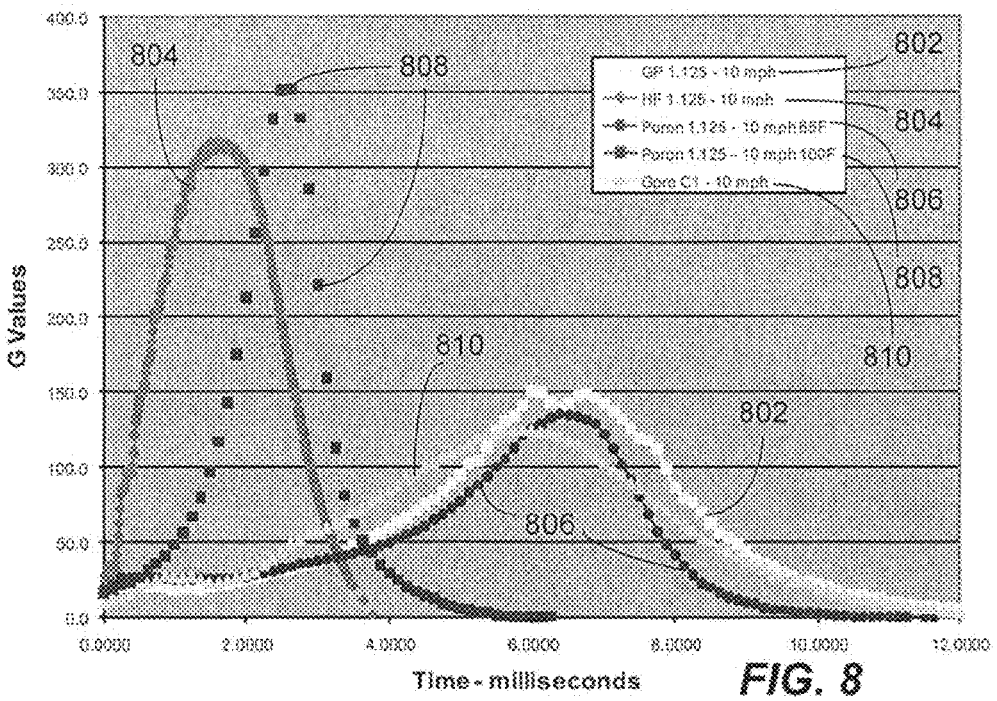
FIG. 8 is a graph illustrating the results of impact testing at 10 mph as a function of G value over time for two embodiments of composite padding material according to the invention, along with other conventional padding materials.

The vertical, or z-axis accelerations were measured with a Vibrametrics accelerometer, model 7002HG attached to the top of the piston. The sensor cable was then connected with a Pro 18-volt power supply, model PSP 10001. A Velleman digital PC oscilloscope, model PCS 100/8031 was used to analyze the sensor output. A subroutine application contained in the software provided by Velleman for the oscilloscope was used to transfer the data to a Microsoft Windows® Excel™ macro application. The voltage signals from the accelerometer were measured using a sampling rate of either 8,000 or 80,000 samples per second depending on the duration of the impact. This sampling rate, along with a vertical resolution of 8 bit analog to digital conversion, provided more than adequate data collection. The analog data counts were converted to millivolts (mV) and then G values. G values are based on earth gravity equivalents with one G being equal to an acceleration rate of 32.2 ft/s$^2$. Testing was carried out using two velocities: 5 and 10 miles per hour. The 5 mph velocity corresponded to a drop height of 10 inches and the 10 mph velocity to a height of 40 inches. The kinetic energy at 10 mph is four times greater than at 5 mph. These velocities were chosen based on the impact protection that most sports helmets claim to provide. The results of the material testing are shown in FIGS. 7 and 8 and tables 1-4 below.

Impact Absorbing Materials List

The following numbered list shows the products, manufacturers, and general characteristics, i.e., density, of the materials that were subjected to impact testing at 5 and 10 mph as disclosed herein. Embodiments of the invention include various combinations of materials numbered 7-11 in the list to achieve the desired impact absorption characteristics. These materials may be combined in multiple layers consisting of flexible polyurethane and/or viscoelastic foams containing individual cells of polyurethane or silicone gel of varying Shore durometer hardness ratings. The individual layers may be bonded and sealed together using silicone rubber, encapsulated polyurethane gel, or any other similar stretchy material.

1. Low density Styrofoam®, generic, with density of 1 lb/ft$^3$. Styrofoam® is a registered trademark of The Dow Chemical Company, P.O. Box 2166, Midland, Mich., 48641.
2. Medium density Styrofoam®, generic, with density of 2 lb/ft$^3$.
3. High density Styrofoam®, sourced from helmet liner of a commercial ski helmet manufacturer, with density of 3 lb/ft$^3$.
4. Tempur-Pedic® brand viscoelastic polyester-based polyurethane foam, with density of 7 lb/ft$^3$. Tempur-Pedic® is a registered trademark of Dan-Foam ApS Corporation, Denmark Holmelund 43 Aarup Denmark DK-5560.
5. Poron® brand viscoelastic polyester-based polyurethane foam, sourced from Rodgers Corp, with density of 7 lb/ft$^3$. Poron® is a registered trademark of World Properties, Inc., 7366 North Lincoln Avenue, Suite 410, Lincolnwood, Ill. 60646.
6. Akton® brand polyurethane gel, Action Products Inc., 65 lb/ft$^3$ Shore Durometer hardness rating of 00-10. Akton® is a registered trademark of Action Products, Inc., 22 N. Mulberry St., Hagerstown, Md. 21740.
7. Viscoelastic polyether-based polyurethane foam, model number VEF-10, 10 lb/ft$^3$, which consists of a 1:1 mixture of: Part A (MSA-018) polyurethane prepolymer and methylene bisphenyl isocyanate with, Part B (PPF-019) polyether polyols, surfactant, and water. VEF-10 is available from Northstar Polymers, LLC, 3444 Dight Avenue South, Minneapolis, Minn. 55406.
8. Polyurethane gel MPP-V37A, sourced from Northstar Polymers (see above), 65 lb/ft$^3$, which consists of a 1:2 to 1:3 ratio of Part A (MPA-135) methylene bisphenyl isocyanate prepolymer resin with, Part B (PNA-157) curing agent, resulting in a material with a Shore Durometer hardness rating of 00-5 to 00-40.
9. Ecoflex® brand supersoft silicone rubber, model number 0010, 65 lb/ft$^3$, which consists of a 1:1 mixture of Part A and B polyorganosiloxane and amorphous silicones resulting in a Shore Durometer hardness rating of 00-10, sourced from Smooth-On, Inc., 2000 St. John Street, Easton, Pa. 18042. Ecoflex® is a registered trademark of Smooth-On, Inc.
10. Dragon Skin® brand platinum cure silicone rubber, sourced from Smooth-On, Inc., 70 lb/ft$^3$, which consists of a 1:1 mixture of Part A and B polyorganosiloxane and amorphous silicones. Dragon Skin® is a registered trademark of Smooth-On, Inc., 2000 St. John Street, Easton, Pa. 18042.
11. FlexFoam-iT® flexible polyurethane foam, Smooth-on, Inc., 5 lb/ft$^3$, which consists of a 1:1 mixture of Part A diphenylmethane diisocyanate and polyurethane polymers with water-based part B. FlexFoam-iT® is a registered trademark of Smooth-On, Inc., 2000 St. John Street, Easton, Pa. 18042.

FIG. 7 shows the results of impact testing at 5 MPH as a function of G Value over time (milliseconds) for an embodiment of a composite padding material according to the invention as well as for conventional materials. More specifically, FIG. 7 illustrates the impact response 702 of a Styrofoam® helmet liner (also referred to as "HelmetF 1.125" in the legend of FIG. 7) that was machined into a 3" diameter disc of 1.125" thickness. The helmet from which the "HelmetF 1.125" sample was sourced was originally manufactured by a well-known and reputable manufacturer. Furthermore the helmet is purported to be compliant with the ASTM standards for helmets.

FIG. 7 further illustrates the impact response 704 for a Poron®™ brand bilayer 1.125" thick, at a temperature of 65° F. This impact response 704 is also referred to as "Poron 65F" in the legend of FIG. 7. Similarly, FIG. 7 also illustrates the impact response 706 of a Poron® brand bilayer 1.125" thick at a temperature of 37° F. This impact response 706 is also referred to as "Poron 37F" in the legend of FIG. 7. FIG. 7 also illustrates the impact response 708 of a sample of Poron® brand bilayer 1.125" thick at a temperature of 100° F. This impact response 708 is also referred to as "Poron 100F" in FIG. 7. The Poron® brand material was tested at 37° F., 65° F., and 100° F. for comparison and to illustrate the effect of temperature on that particular material.

Finally, FIG. 7 illustrates the impact response 710 of an embodiment of a laminated composite padding 1.125" thick formed according to the invention, referred to as "G Pro™ 1.125" (or "Gpro 1.125" in the legend of FIG. 7). The G Pro™ 1.125 padding is formed of three approximately 0.25" layers of Northstar viscoelastic foam matrix (VEF-10) and cylindrical elements filed with polyurethane gel in the configuration of composite padding 400 and 400' shown in FIG. 5 with an additional 0.5" layer of the Northstar viscoelastic polyurethane foam material (VEF-10) without any holes or gel-filled cylindrical elements for a total thickness of 1.125".

Table 1 below illustrates 5 mph impact performance responses for various room temperature samples of varying thicknesses for comparison. More particularly, Table illustrates maximum G value, time to peak (ms), and impact duration (ms) for embodiments of the composite padding material according to the invention (G Pro™ in two thicknesses: 0.75" and 1.125") along with other conventional padding materials including Styrofoam®, Poron® Bilayer, Tempur-Pedic® Foam, Northstar VEF-10 Foam, Biogel® brand padding (a registered trademark of Regent Medical Limited, 1 Silk Street, London, United Kingdom, EC2Y 8HQ), Intelli-gel® brand mattress padding (a registered trademark of Edi-Zone, LLC, 123 East 200 North, Alpine, Utah 84004). Generally speaking, desirable padding material properties are: lower maximum G, longer time to peak and longer impact duration. From the results shown in Table 1, the two G Pro™ embodiments appear to perform better than all of the conventional materials except for the Poron® Bilayer, 1.125". G Pro™ is a trademark of Katasha Corporation, P.O. Box 895, Eden, Utah 84310, and is associated with the inventive composite and laminated padding materials disclosed herein.

TABLE 1

Room Temperature Impact Measurements at 5 mph

| Material - Thickness (inches) | Maximum (G) | Time to Peak (ms) | Impact Duration (ms) |
|---|---|---|---|
| Biogel ® - 0.625" | 58 | 4.625 | 13.0 |
| Intelli-gel ® - 0.625" | 80 | 6.500 | 13.0 |
| Northstar VEF-10 Foam - 0.75" | 51 | 6.875 | 13.0 |
| Tempur-pedic ® Foam - 0.75" | 36 | 3.000 | 13.0 |
| Poron ® Bilayer - 1.125" | 18 | 9.250 | 18.0 |
| G Pro ™ - 0.75" | 42 | 6.750 | 14.2 |
| G Pro ™ - 1.125" | 30 | 9.250 | 14.2 |
| LD Styrofoam ® - 0.75" | 72 | 4.125 | 10.5 |
| LD Styrofoam ® - 1.375" | 55 | 4.375 | 12.0 |
| Helmet Styrofoam ® - 0.56" | 238 | 1.412 | 2.50 |
| Helmet Styrofoam ® - 1.125" | 185 | 1.925 | 4.00 |

Table 2 below illustrates 10 mph impact performance responses for three sample materials Tempur-Pedic® Foam, 0.75" thick, Poron® Bilayer at 1.125" thick and G Pro™ 0.75" thick at a range of temperatures to illustrate the effect of temperature on those three padding materials. Again, it is desirable that padding materials have the following properties: lower maximum G, longer time to peak and longer impact duration. However, it is also desirable that a padding material maintain those characteristics over a reasonable range of temperatures. For example, helmets used for winter sports may be exposed to temperatures significantly below freezing. In contrast helmets used in autoracing, motorcycling, bicycling, skateboarding or other summer activities may expose the padding material to temperatures exceeding 100° F. So, it is desirable to have a padding material that is relatively insensitive to temperature variation.

From the data shown in Table 2, it can be observed that Tempur-Pedic® foam has good padding characteristics at 65° F. (near room temperature). However, at very cold temperatures, e.g., 0° F., the material becomes hard and the maximum G value jumps significantly. Similarly, the Poron® Bilayer material behave ideally at 65° F. and its performance degrades with hotter or cooler temperatures. The G Pro™ embodiment of the invention in contrast has relatively stable maximum G values over the range of temperatures shown in Table 2. Furthermore, the G Pro™ embodiment has relatively good characteristics at 0° F., unlike the Tempur-Pedic® Foam.

TABLE 2

Temperature Effect on G Impact at 5 mph

| Material - Thickness (inches), Temperature (° F.) | Maximum (G) | Time to Peak (ms) | Impact Duration (ms) |
|---|---|---|---|
| Tempur-pedic ® Foam, 0.75", 0° F. | 130 | 2.250 | 6.00 |
| Tempur-pedic ® Foam, 0.75", 37° F. | 72 | 2.500 | 14.0 |

TABLE 2-continued

Temperature Effect on G Impact at 5 mph

| Material - Thickness (inches), Temperature (° F.) | Maximum (G) | Time to Peak (ms) | Impact Duration (ms) |
|---|---|---|---|
| Tempur-pedic ® Foam, 0.75", 65° F. | 36 | 2.875 | 14.0 |
| Tempur-pedic ® Foam, 0.75", 100° F. | 54 | 8.000 | 14.0 |
| Poron ® Bilayer, 1.125", 37° F. | 57 | 2.500 | 8.12 |
| Poron ® Bilayer, 1.125", 65° F. | 18 | 9.250 | 18.0 |
| Poron ® Bilayer, 1.125", 100° F. | 64 | 5.125 | 9.37 |
| G Pro ™, 0.75", 0° F. | 46 | 4.500 | 12.4 |
| G Pro ™, 0.75", 37° F. | 41 | 6.500 | 15.0 |
| G Pro ™, 0.75", 65° F. | 42 | 6.500 | 14.2 |
| G Pro ™, 0.75", 100° F. | 42 | 8.000 | 15.6 |

Figure 12:
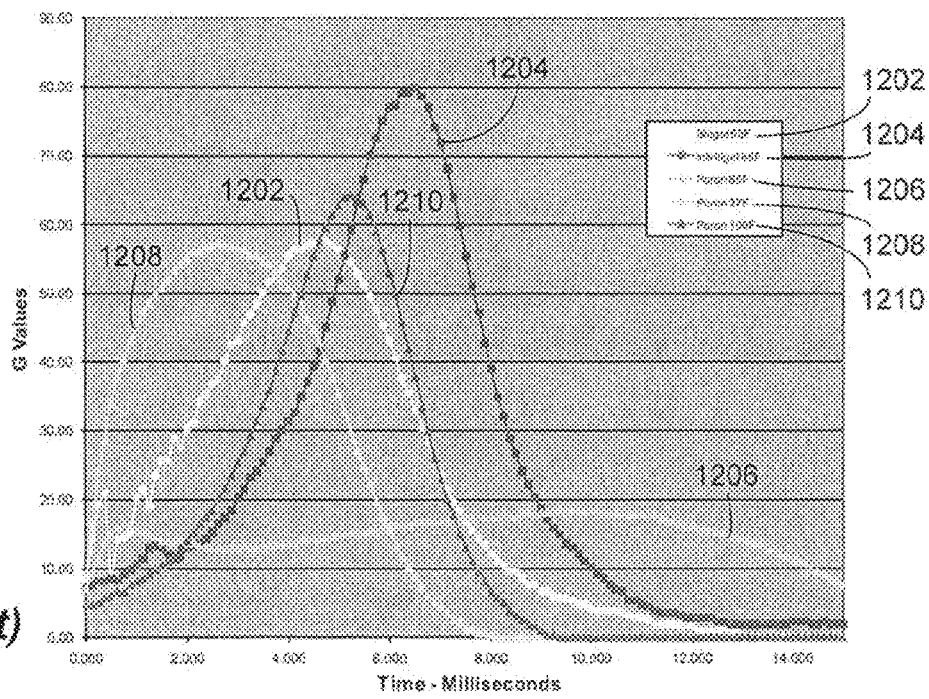
FIG. 12 is a graph illustrating the effect of temperature on the performance characteristics of conventional padding material, Poron®, for a 5 mph impact.
Figure 13:
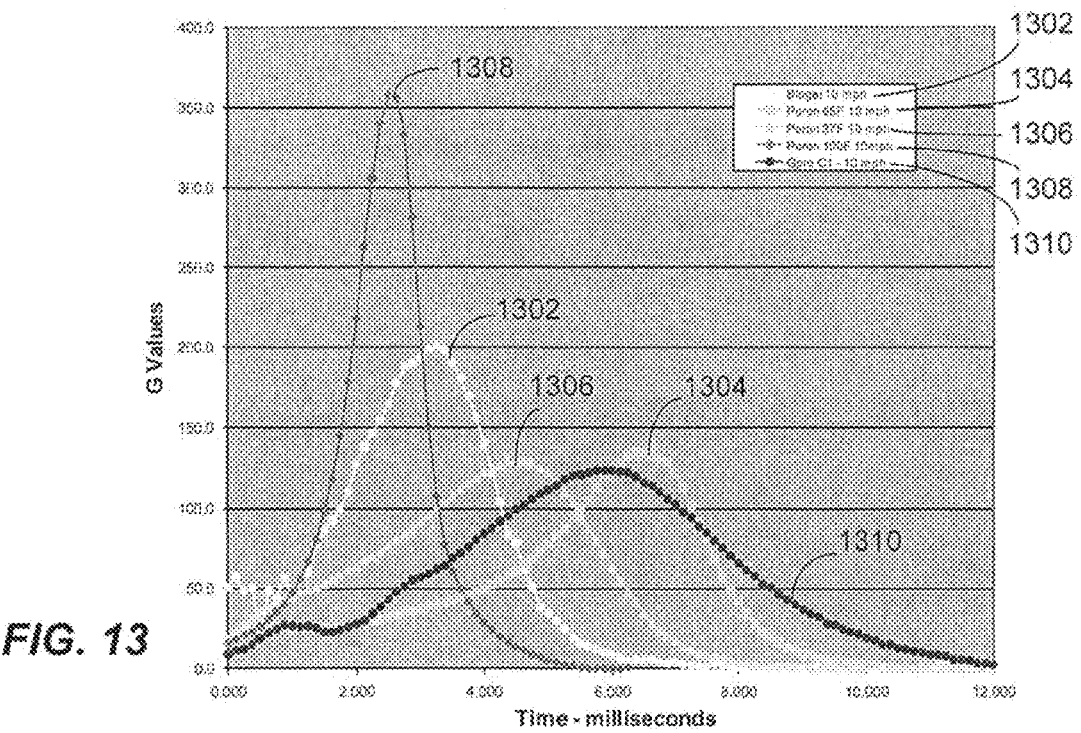
FIG. 13 is a graph illustrating the effect of temperature on the 10 mph impact performance of Poron® at three temperatures, 37° F., 65° F. and 100° F., Biogel® at 65° F. and an embodiment of G Pro™ C1 1.25", according to the invention.

FIG. 7 graphically illustrates that temperature plays a significant role in the performance of the Poron® sample at temperatures ranging from a relatively cold 37° F. 706, up to near room temperature 65° F. 704 and finally a relatively hot 100° F. 708. The near room temperature Poron® 65° F. 704 has the more desirable padding characteristics, i.e., lowest maximum G, longest time to peak and longest impact duration relative to the other two temperature extreme testing samples of Poron®. The G Pro™ 1.125" 710 sample had near ideal characteristics also. FIG. 7 also shows the relatively poor performance, i.e., high maximum G and short impact duration of conventional Styrofoam® used in helmets. FIGS. 12 and 13, discussed below, further illustrates the effect of temperature on the conventional padding material, Poron®.

FIG. 12 is a graph illustrating the effect of temperature on a particular conventional padding material, Poron®, along with two other conventional padding materials, Biogel® and Intelli-gel® at room temperature (65° F.) for a 5 mph impact. More specifically, FIG. 12 illustrates the 5 mph impact response of Biogel® at 65° F. 1202, Intelli-gel® at 65° F. 1204, Poron® Bilayer 65° F. 1206, Poron® Bilayer 37° F. 1208 and Poron® Bilayer 100° F. 1210. The conclusion to drawn from FIG. 12 is that the Poron® Bilayer material performs very well at room temperature (65° F. 1206), but degrades in performance significantly at elevated (100° F. 1210) or reduced (37° F. 1208) temperatures.

FIG. 13 is a graph illustrating the effect of temperature on the 10 mph impact performance of Poron® at three temperatures, 37° F. 1306, 65° F. 1304 and 100° F. 1308, Biogel® at 65° F. 1302 and an embodiment of G Pro™ C1 1.25" 1310. Observations drawn from FIG. 13 include: (1) G Pro C1 1.25" material has a very desirable impact response 1310: lowest G value, second longest time-to-peak and longest impact duration, (2) the Poron® at 65° F. 1304 performs very well, but at lower temperature, 37° F. 1306 and especially higher temperature, 100° F. 1308, performance degrades significantly.

Figure 17:
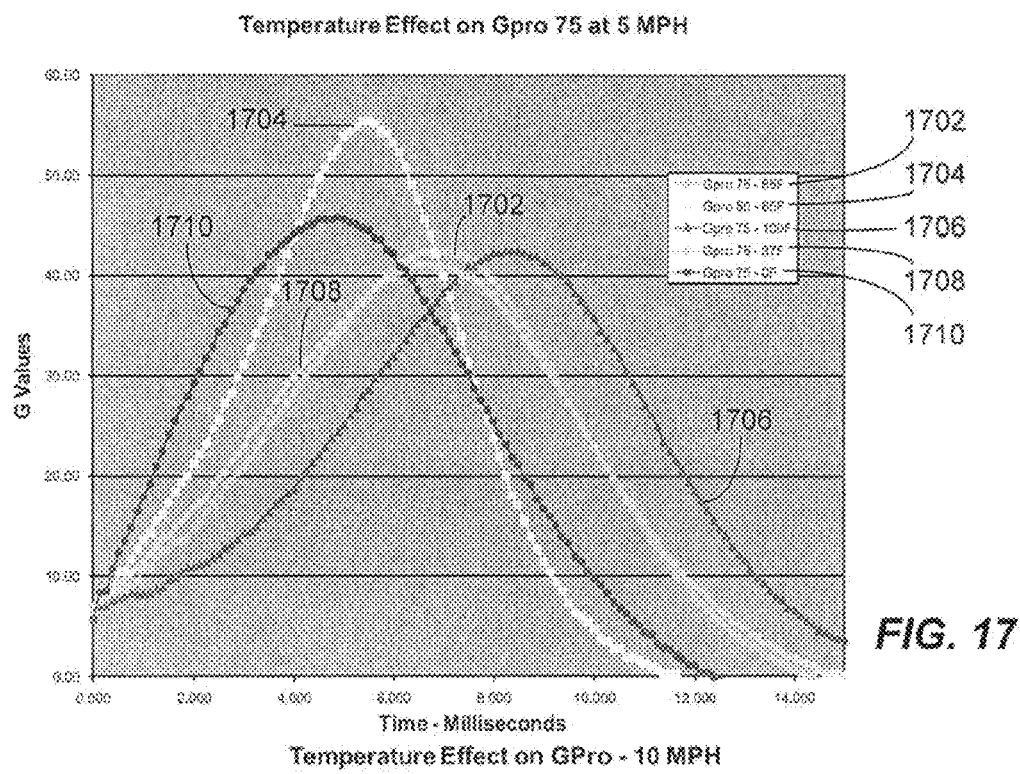
FIG. 17 is a graph illustrating the effect of temperature on the 5 mph impact performance of an embodiment of a laminated composite material, G Pro™ 75, according to the invention.

FIG. 17 is a graph illustrating the effect of temperature on the 5 mph impact performance of an embodiment of a laminated composite material, G Pro™ 75, according to the invention. G Pro™ 75 is a laminated composite padding material approximately 0.75" thick formed of three layers, each layer approximately 0.25" thick in the configuration shown in FIG. 4, according to the present invention. G Pro™ 50 is a two layer laminated composite padding material having total thickness of approximately 0.50", wherein each individual layer is approximately 0.25" thick and in the configuration of FIG. 4, according to the present invention. More specifically, FIG. 17 shows impact results for G Pro™ 75 at 65° F. 1702. FIG. 17 also shows impact results for G Pro™ 50 at 65° F. 1704 for comparison. The thinner embodiment, G Pro™ 50 at 65° F. 1704, does not perform as well as the thicker embodiment, G Pro™ 75 at 65° F. 1702, simply because there is less of the same padding material to absorb the impact. FIG. 17 also shows impact results for G Pro™ 75 at 100° F. 1706, which has the favorable characteristics of the longest time-to-peak and impact durations of the samples illustrated in FIG. 17. FIG. 17 also illustrates impact results for G Pro™ 75 at 37° F. 1708, near freezing. G Pro™ 75 at 37° F. 1708 responds almost identically to G Pro™ 75 at 65° F. 1702, which suggest performance stability over the temperature range 37° F. of 65° F. Finally, FIG. 17 shows impact results for G Pro™ 75 at 0° F. 1710, below freezing. Though there is some degradation in impact performance with G Pro™ 75 at 0° F. 1710, the resulting loss of performance is not as dramatic as for Poron®, or Tempur-Pedic® padding materials which both become brittle and fracture at the lower temperatures (0° F.), see footnote in Table 4, below.

Figure 18:
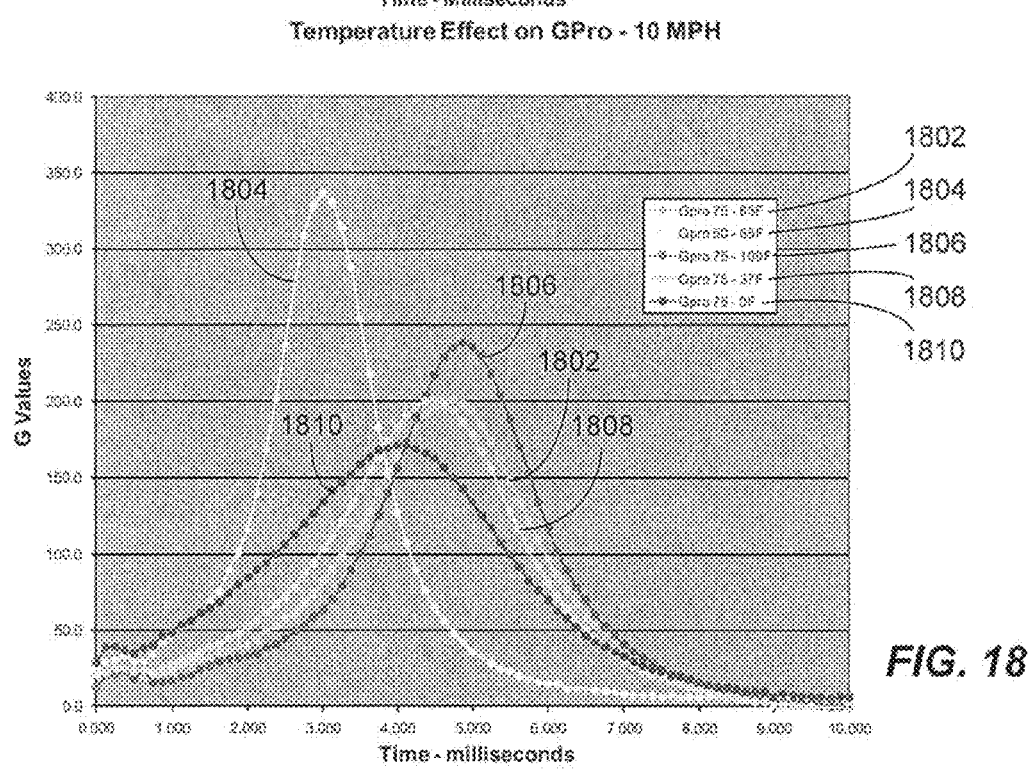
FIG. 18 is a graph illustrating the effect of temperature on the 10 mph impact performance of an embodiment of a laminated composite material, G Pro™ 75, according to the invention.

FIG. 18 is a graph illustrating the effect of temperature on the 10 mph impact performance of an embodiment of a laminated composite material, G Pro™ 75, according to the invention. More specifically, FIG. 1 shows impact results for G Pro™ 75 at 65° F. 1802. FIG. 18 also shows impact results for G Pro™ 50 at 65° F. 1804 for comparison. The thinner embodiment, G Pro™ 50 at 65° F. 1804, does not perform as well as the thicker embodiment, G Pro™ 75 at 65° F. 1802, simply because there is less of the same padding material to absorb the impact. FIG. 18 also shows impact results for G Pro™ 75 at 100° F. 1806, which has the favorable characteristic of the longest time-to-peak of the samples illustrated in FIG. 18. FIG. 18 also illustrates impact results for G Pro™ 75 at 37° F. 1808, near freezing. Again, G Pro™ 75 at 37° F. 108 responds almost identically to G Pro™ 75 at 65° F. 1802, which suggest performance stability over the temperature range 37° F. of 65° F. Finally, FIG. 18 shows impact results for G Pro™ 75 at 0° F. 1810, below freezing.

FIG. 8 is a graph illustrating the results of impact testing at 10 mph as a function of G Value over time (milliseconds) for two embodiments of composite padding material according to the invention along with other conventional padding materials. The main difference between the data shown in FIG. 8 is that the impact speed has been doubled relative to FIG. 7.

Figure 14:
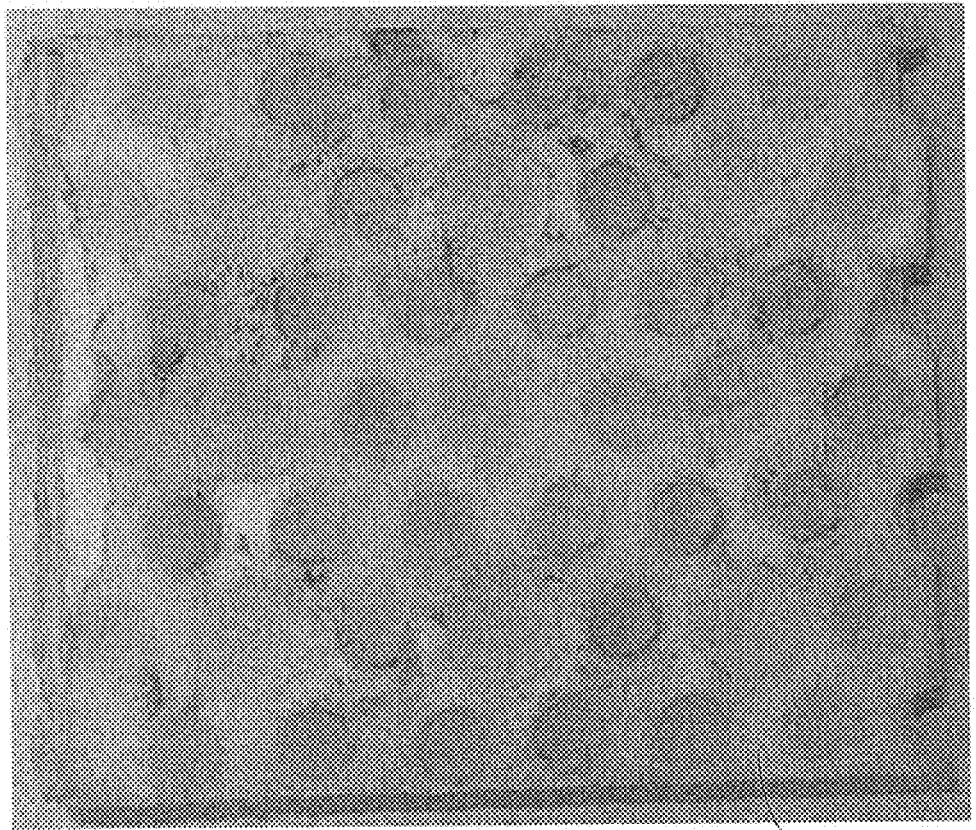
FIGS. 14 and 15 are photographic images of plan and perspective elevation views of an embodiment of G Pro 1.125" composite padding material, according to the invention.
Figure 15:

More specifically, FIG. 8 illustrates the impact response 802 for an embodiment of a laminated composite padding material referred to as G Pro™ 1.125, which is approximately 1.125" thick, and formed by laminating three layers of composite padding material, each approximately ⅜" in thickness and constructed in the configuration shown in FIG. 4. A sample embodiment of G Pro™ 1.125 is shown generally at 1400 in the photographic images of FIGS. 14 and 15. More specifically, FIGS. 14 and 15 are plan and perspective elevation photographic images of an embodiment of G Pro™ 1.125 composite padding material, according to the invention.

FIG. 8 also illustrates the impact response 804 of Helmet Styrofoam® 1.125", referred to as "HF" in the legend of FIG. 8. Helmet Styrofoam® 1.125" response 804 was measured from a Styrofoam® helmet liner that was machined into a 3 inch diameter disc of 1.125" thickness. The helmet from which the sample "HF" sample was extracted was produced by a well-known and reputable manufacturer. Furthermore, the helmet was supposedly compliant with the ASTM standards for helmets.

FIG. 8 further illustrates the impact responses 806 and 808 of a Poron® brand bilayer 1.125" in thickness, tested at 65° F., and 100° F., for comparison on the effect of temperature on the material. Refer also to FIGS. 7 and 12, as well as the data in Table 2, and the related discussions regarding same herein for further description of the dependence on temperature of the impact performance of the conventional Poron® brand bilayer 1.125" padding material.

Figure 16:
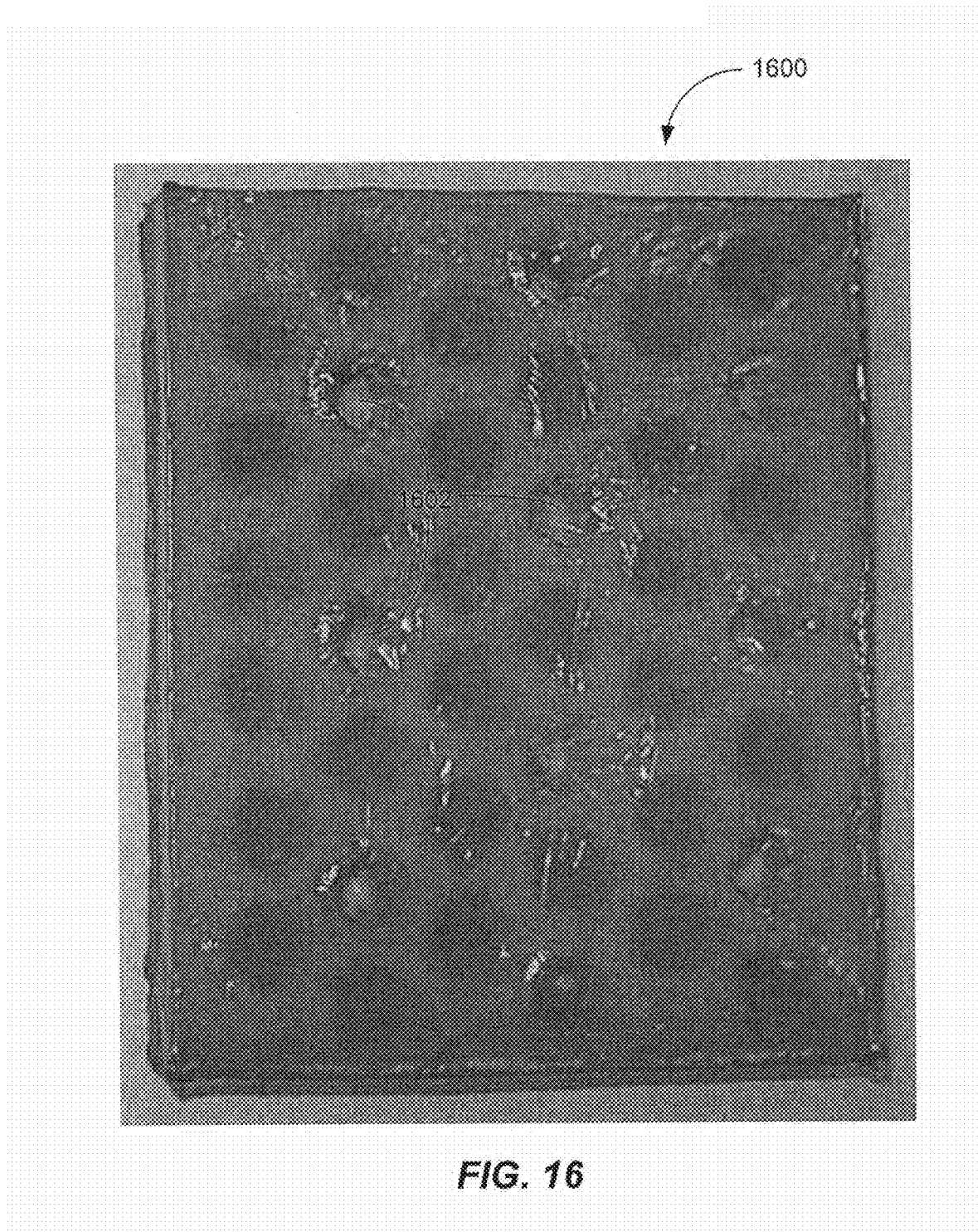
FIG. 16 is a photographic image of a top view of an embodiment of G Pro™ C1 1.25", according to the invention.

Finally, FIG. 8 illustrates the impact response 810 of another embodiment of the inventive laminated composite padding material referred to herein as G Pro™ C1 1.25. At approximately 1.25" in thickness, the G Pro™ C1 1.25 is slightly thicker than G Pro™ 1.125. G Pro™ C1 1.25 is formed of two layers of composite padding material, according to the invention. The first layer is a ⅝" thick layer of composite padding material in the configuration of FIG. 4, i.e., a viscoelastic foam matrix with large air-filled cylindrical voids and smaller gel-filled cylindrical cells. The second layer is a ⅝" thick layer of flexible polyurethane foam matrix in the configuration of FIG. 1, i.e., surrounding an array of identically sized cylindrical elements that are gel-filled with some air-filled voids 1602. The two layers are laminated and encapsulated with a soft coating. FIG. 16 is a photographic image of a top view of a sample embodiment of G Pro™ C1 1.25", referenced generally at arrow 1600.

Table 3, below, provides impact measurements at 10 mph for two embodiments of the inventive composite padding material, namely, G Pro™ 75 (0.75" thick) and G Pro™ 1.125 (1.125" thick). Table 3 also provides impact measurements at 10 mph for other conventional padding materials, namely Biogel—0.625", Intelligel—0.625", Northstar VEF-10 Foam—0.75", Tempur-Pedic® Foam—0.75", Poron® Bilayer—1.125", Low Density Styrofoam®—0.75" and 1.375", and Helmet Styrofoam®—0.56" and 1.125".

TABLE 3

Impact Measurements at 10 mph

| Material - Thickness (inches) | Maximum (G) | Time to Peak (ms) | Impact Duration (ms) |
|---|---|---|---|
| Biogel ® - 0.625" | 201 | 3.250 | 8.12 |
| Intelli-gel ® - 0.625" | 405 | 1.212 | 2.75 |
| Northstar VEF-10 Foam - 0.75" | 343 | 4.375 | 12.5 |
| Tempur-pedic ® Foam - 0.75" | 196 | 4.500 | 8.00 |
| Poron ® Bilayer - 1.125" | 135 | 6.375 | 10.5 |
| G Pro ™ - 75 (0.75" thick) | 201 | 4.625 | 9.50 |
| G Pro ™ - 1.125 (1.125" thick) | 124 | 5.750 | 12.5 |
| Low Density Styrofoam ® - 0.75" | 168 | 4.500 | 12.9 |
| Low Density Styrofoam ® - 1.375" | 101 | 6.375 | 12.6 |
| Helmet Styrofoam ® - 0.56" | 340 | 1.450 | 3.35 |
| Helmet Styrofoam ® - 1.125" | 318 | 1.625 | 3.77 |

From Table 3 above, it appears that the Poron® Bilayer 1.125", G Pro™ 1.125" (an embodiment of inventive padding material) and Low Density Styrofoam® 1.375" all performed well at the higher speed impact. Not surprisingly, the thinner embodiments and samples of like materials all tend to perform worse than their thicker counterparts. Interestingly, the Low Density Styrofoam® 1.375" arguably performed the best of the samples tested, i.e., lowest maximum G, longest time to peak measurements and second longest impact duration. However, it should be noted that Styrofoam®, whether high density (Helmet Styrofoam®) or low density, is subject to structural damage after a single impact. Thus, Styrofoam® can cushion a single hard impact and then must generally be discarded because it loses its integrity. This is not the case with the inventive padding materials, G Pro™ or the other padding materials that have some elasticity.

Table 4, below, provides impact data for Tempur-Pedic® Foam 0.75", Poron® Bilayer 1.125" and the inventive G Pro™ in two thickness embodiments. For each of these padding materials, the impact performance was measured at a range of temperatures to determine whether such materials degrade at temperatures significantly above or below standard room temperature, e.g., 65° F.

TABLE 4

Temperature Effect on G Impact at 10 mph

| Material - Thickness (inches), Temperature (° F.) | Maximum (G) | Time to Peak (ms) | Impact Duration (ms) |
|---|---|---|---|
| Tempur-pedic ® Foam, 0.75", 0° F. * | 225 | 2.625 | 6.25 |
| Tempur-pedic ® Foam, 0.75", 37° F. | 136 | 3.125 | 7.37 |
| Tempur-pedic ® Foam, 0.75", 65° F. | 196 | 4.500 | 8.00 |
| Tempur-pedic ® Foam, 0.75", 100° F. | 409 | 0.900 | 2.24 |
| Poron ® Bilayer, 1.125", 37° F. ** | 129 | 4.625 | 9.00 |
| Poron ® Bilayer, 1.125", 65° F. | 135 | 6.375 | 10.5 |
| Poron ® Bilayer, 1.125", 100° F. | 357 | 2.500 | 5.62 |
| G Pro, 0.75", 0° F. | 171 | 4.000 | 10.1 |
| G Pro, 0.75", 37° F. | 201 | 4.500 | 9.37 |
| G Pro, 0.75", 65° F. | 201 | 4.625 | 9.50 |
| G Pro, 1.125", 65° F. | 124 | 5.750 | 12.5 |
| G Pro, 0.75", 100° F. | 238 | 4.875 | 9.75 |

Footnotes:
* Tempur-pedic ® foam fractured at 0° F. after repeated testing.
** Poron ® Bilayer was not tested at 0° F. due to the similarity to Tempur-pedic ® foam.

Figure 9:
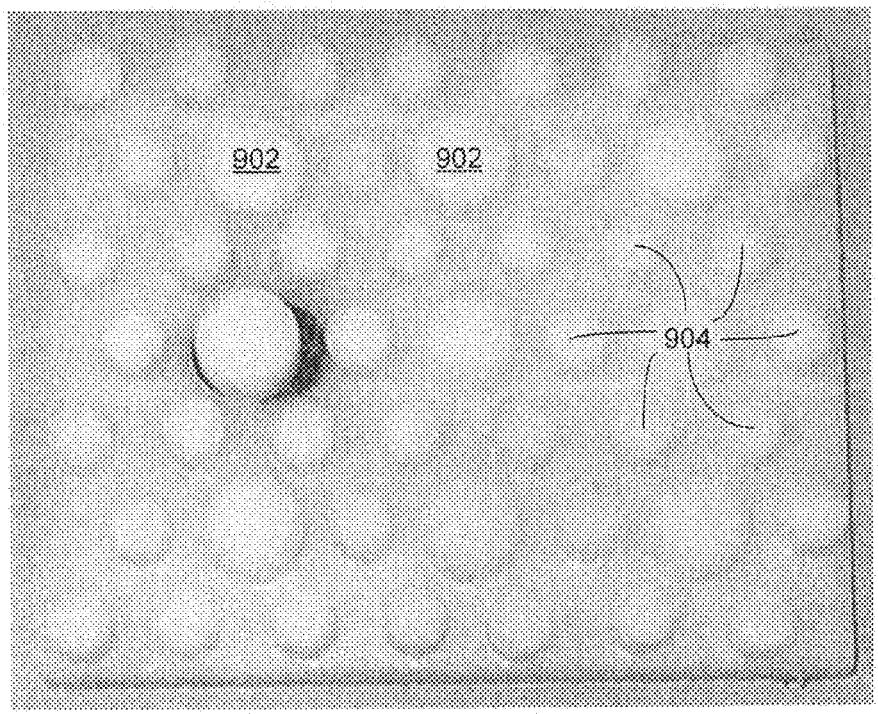
FIG. 9 is a photographic image of a mold used to form a polyurethane foam block with large and small cylindrical structures, according to an embodiment of the invention.

FIG. 9 is a photographic image of a mold 900 used to form a polyurethane foam block with large 902 and small 904 cylindrical structures for forming voids such as those described in the polyurethane foam 406 of composite padding material 400 (FIG. 4). Mold 900 may be formed of any suitable material including hard plastics, Teflon®, metal or other materials used for molding polyurethane foam materials known to those of ordinary skill in the art. It will be understood that mold 900 may have any suitable dimensions or configuration of cylindrical structures 902 and 904 for forming polyurethane foam blocks of any suitable dimensions or characteristics by simply scaling the dimensions and selecting size and placement of the cylindrical structures 902 and 904. Though two sizes of cylindrical structures 902 and 904 are shown in FIG. 9, it will also be understood that any number of sizes and shapes of structures may be used to form voids in a polyurethane foam block according to various embodiments of the invention.

Figure 10:
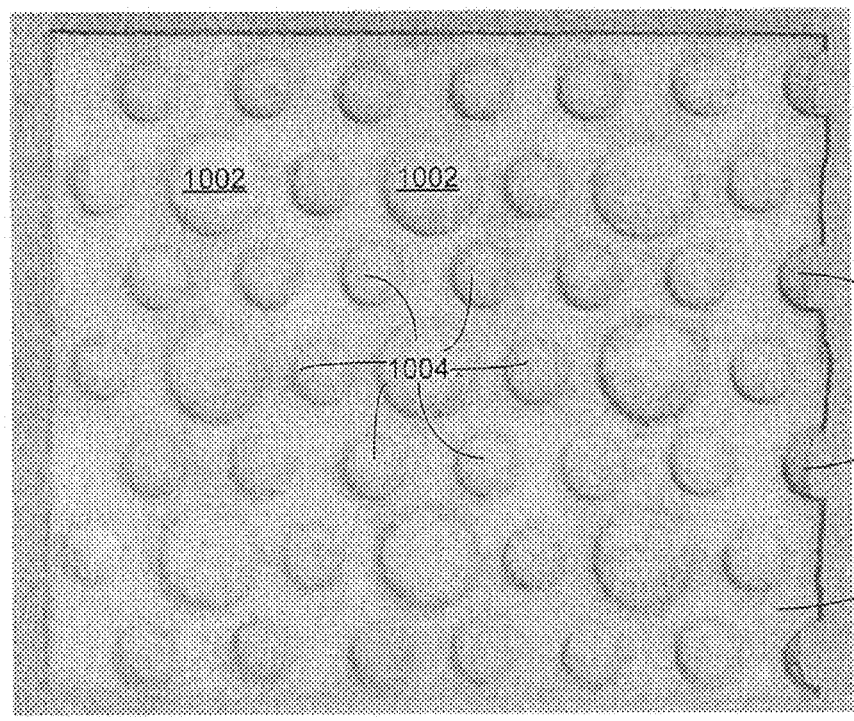
FIG. 10 is a photographic image of a polyurethane foam block having larger and smaller voids formed using the mold shown in FIG. 9.

FIG. 10 is a photographic image of top view of a polyurethane foam block 1000 having larger and smaller voids 1002 and 1004, respectively, formed using the mold 900 shown in FIG. 9. Polyurethane foam block 1000 also includes a sealing layer 1006 on the bottom of the polyurethane foam 1008 that seals the bottom end of voids 1002 and 1004. As noted above, the sealing layer 1006 may be soft gel or hard polyurethane plastic shell material, or any other thin flexible material that can provide a protective coating for the composite padding encased within.

Figure 11:
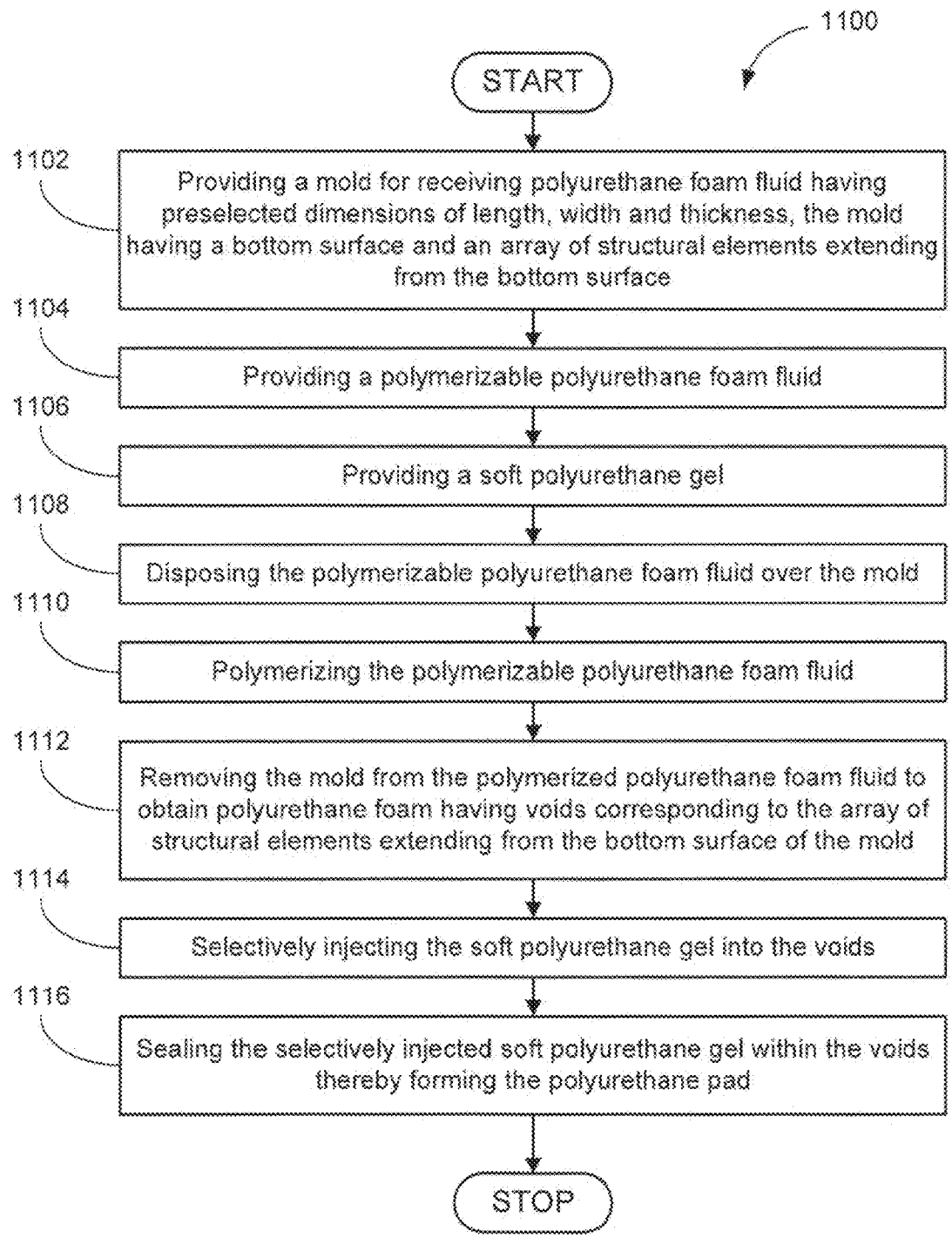
FIG. 11 is a flowchart of an embodiment of a method of forming a polyurethane pad, according to the invention.

FIG. 11 is a flowchart of an embodiment of a method 1100 of forming a polyurethane pad, according to the invention. Method 1100 may include providing a mold 1102 for receiving polyurethane foam fluid having preselected dimensions of length, width and thickness, the mold having a bottom surface and an array of structural elements extending from the bottom surface. An exemplary mold 900 is shown in FIG. 9 and discussed above. The mold may be formed of any suitable material for molding polyurethane foam fluid, e.g., hard plastic, Teflon®, and metal mold materials. According to an alternative embodiment, the mold may also include a tray (not shown) for use with the mold. According to this alternative embodiment, the polyurethane foam fluid may be poured into the tray and the mold then inserted into pool of polyurethane foam fluid to properly shape the polyurethane foam fluid prior to polymerization.

Method 1100 may further include providing a polymerizable polyurethane foam fluid 1104. According to one embodiment, the polymerizable polyurethane foam fluid may be Poron®™ brand viscoelastic polyester-based polyurethane foam, sourced from Rodgers Corp, with density of 7 lb/ft$^3$. Of course other polymerizable polyurethane foam fluids may be provided according to other embodiments of method 1100.

Method 1100 may further include providing a soft polyurethane gel 1106. According to one embodiment, the soft polyurethane gel may be Akton™ brand polyurethane gel, Action Products Inc., 65 lb/ft$^3$ Shore Durometer hardness rating of OO 10. One of ordinary skill in the art will recognize that other soft polyurethane gels may be provided and used according to other embodiments of method 1100.

Method 1100 may further include disposing the polymerizable polyurethane foam fluid over the mold 1108. According to various embodiments of method 1100, disposing the polymerizable polyurethane foam fluid over the mold 1108 may include pouring, injecting, spreading the foam fluid to cover the mold and its structural elements extending from the bottom surface of the mold.

Method 1100 may further include polymerizing the polymerizable polyurethane foam fluid 1110. According to various embodiments, polymerizing 1110 may be achieved chemically, by heating, by exposure to ultraviolet light or by any other means for converting the fluid to a solid form known to those of ordinary skill in the art.

Method 1100 may further include removing the mold from the polymerized polyurethane foam fluid 1112 to obtain polyurethane foam having voids corresponding to the array of structural elements extending from the bottom surface of the mold. Removing the mold may be as simple as peeling the polyurethane foam away from the mold, according to one embodiment of the invention.

Method 1100 may further include selectively injecting the soft polyurethane gel into the voids 1114. Any suitable means of injecting the soft polyurethane gel into the voids may be used to place the gel into the voids configured to receive the gel. Such means are within the knowledge of one of ordinary skill in the art and will not be further elaborated herein.

Method 1100 may further include sealing the selectively injected soft polyurethane gel within the voids 1116, thereby forming the polyurethane pad. Sealing 1116 may be achieved by encapsulating the polyurethane pad in a soft flexible covering, or laminating a resilient soft layer to cover the polyurethane gel-filled voids to form cylindrical elements (e.g., 102, FIG. 1), according to embodiments of the invention.

Method 1100 may further include placing a sealing layer over the polymerizable polyurethane foam fluid in the mold adjacent to distal ends of the structural elements prior to polymerizing. The sealing layer may be any suitable soft flexible covering, or laminating a resilient soft layer used to form a seal at one end of the voids.

According to an embodiment of method 1100, the polymerizable polyurethane foam fluid forms a flexible polyurethane foam material when polymerized. According to another embodiment of method 1100, the polymerizable polyurethane foam fluid forms a viscoelastic polyurethane foam material when polymerized.

Method 100 may further include laminating a plurality of the polyurethane pads to form a laminated polyurethane pad. The laminating may be achieved using any suitable adhesive that will reliably attach the pads to each other. By laminating the pads together, any suitable thickness of the composite padding material may be achieved.

An embodiment of a composite cushion is disclosed. The composite cushion may include an elastic matrix having an array of voids formed between webbing within the matrix. The elastic matrix may be formed of flexible polyurethane foam, according to one embodiment of the cushion. The elastic matrix may be formed of viscoelastic polyurethane foam, according to another embodiment of the cushion. The array of voids may be regularly spaced and of identical size, according to one embodiment of the cushion. The array of voids may be spaced in a regular pattern, but of a plurality of sizes, according to other embodiments of the cushion. The array of voids may be generally cylindrical in shape, according to one embodiment of the cushion. The array of voids may be square, triangular, hexagonal, octagonal in cross-section, or other suitable shapes for receiving a soft viscous gel, according to other embodiments of the cushion. The array of voids may pass completely through the elastic matrix, according to one embodiment of the cushion. The array of voids may be disposed partially within the elastic matrix, according to another embodiment of the cushion. The elastic matrix may be polyurethane foam 104 as shown in FIG. 1, according to one embodiment of the cushion.

The composite cushion may further include a regularly spaced subset of the array of voids filled with a soft viscous gel, each gel-filled void forming a gel element surrounded by elastic matrix webbing. Composite padding material 400 shown in FIG. 4 and discussed herein is an embodiment of a composite cushion with a regularly spaced subset 402 of the array of voids filled with a soft viscous gel. Hexagonally oriented gel elements A-D shown in FIG. 3, is another embodiment of a composite cushion with a regularly spaced subset of the array of voids filled with a soft viscous gel. It will be readily apparent to one of ordinary skill in the art in possession of this disclosure that a virtually infinite number of variations or embodiments of a cushion may be obtained by varying the sizes and geometric configurations of the gel-filled voids along with layers of lamination are possible and within the scope of the present invention.

The composite cushion may further include the remaining voids (i.e., non gel-filled voids) filled with an ambient pressure, compressible gas, thereby forming regularly interspersed gaseous voids within the elastic matrix. The gas may be air, according to one embodiment of the cushion. The gas may be any inert or non-inert gas according to other embodiments of the cushion. The gas-filled voids may be larger or smaller than the gel-filled voids, according to various embodiments of the cushion.

The composite cushion may further include a membrane encapsulating the elastic matrix, the gel elements and the gaseous to form the composite cushion. The membrane may be a silicone or urethane coating, according to embodiments of the cushion. The membrane may be any suitable flexible coating material for protecting the composite cushion encased within.

The composite cushion may further be structured and arranged such that when compressed the gel elements flatten thereby compressing the surrounding matrix webbing and adjacent gaseous voids to absorb compressive forces. Thus, the gel elements displace, but do not significantly compress, whereas, the elastic matrix webbing is configured to compress significantly and the gaseous voids even more so.

According to yet another embodiment, a composite laminated cushion may be formed of a plurality of composite cushions laminated together, each composite cushion having a structure as disclosed herein. The formation of a laminated composite cushion allows padding materials of any suitable thickness to be constructed by simply adding additional layers of the basic composite padding material configuration. It will also be readily apparent that the layers need not be of the same identical configuration according to other embodiments of the composite laminated cushion.

In understanding the scope of the present invention, the term "configured" as used herein to describe a component, section or part of a device includes any suitable shape, construct or permutation suitable to carry out the desired function. In understanding the scope of the present invention, the term "comprising" and its derivatives "including" and "having", as used herein, are intended to be open ended terms that specify the presence of the stated features, elements, components, or groups, but do not exclude the presence of other unstated features, elements, components, or groups. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below, underneath and transverse" as well as any other similar directional terms refer to those directions relative to embodiments of padding materials described and illustrated herein. Finally, terms of degree such as "substantially", "about" and "approximately" as used herein mean a reasonable amount of deviation of the modified term such that the end result is not significantly changed. Thus, such terms will not be ambiguous or indefinite to one or ordinary skill in the art.

While the foregoing advantages of the present invention are manifested in the detailed description and illustrated embodiments of the invention, a variety of changes can be made to the configuration, design and construction of the invention to achieve those advantages. Hence, reference herein to specific details of the structure and function of the present invention is by way of example only and not by way of limitation.

What is claimed is:

1. An elastic composite cushion, comprising:
an array of viscous gel elements;
an elastic matrix encapsulating the array of viscous gel elements;
a membrane encapsulating the elastic matrix, wherein the membrane comprises a silicone or urethane coating; and
wherein upon compression of the elastic composite cushion, the gel elements flatten until adjacent neighboring gel elements restrict further flattening.

2. The cushion according to claim 1, wherein the gel elements comprise an uncompressed shape selected from the group consisting of: cylindrical, spherical and cubic.

3. The cushion according to claim 1, wherein the elastic matrix comprises at least one of: flexible polyurethane, viscoelastic polyurethane, urethane, or silicone rubber.

4. The cushion according to claim 1, wherein the viscous gel comprises at least one of: polyurethane gel or silicone gel.

5. The cushion according to claim 1, further comprising a layer of composite padding having preselected dimensions of length, width and thickness.

6. The cushion according to claim 1, further comprising laminating two or more layers of the composite cushion recited in claim 1.

7. The cushion according to claim 1, further comprising regularly spaced voids encapsulated by the elastic matrix, the voids containing a compressible gas.

8. The cushion according to claim 7, wherein the compressible gas comprises air.

9. A composite cushion, comprising:
an elastic matrix having an array of voids formed between webbing within the matrix;

a regularly spaced subset of the array of voids filled with a soft viscous gel, each gel-filled void forming a gel element surrounded by webbing from the elastic matrix;

remaining voids filled with an ambient pressure, compressible gas, thereby forming regularly interspersed gaseous voids;

a membrane encapsulating the elastic matrix, the gel elements and the gaseous voids to form the composite cushion, wherein the membrane comprises a silicone or urethane coating; and the composite cushion structured and arranged such that when compressed the gel elements flatten thereby compressing the surrounding matrix webbing and adjacent gaseous voids to absorb compressive forces.

10. A composite laminated cushion, comprising a plurality of composite cushions laminated together, each composite cushion having a structure as recited in claim 9.

* * * * *